March 18, 1969 G. C. BROWN ET AL 3,433,426

REWIND CONTROL CIRCUIT

Filed June 8, 1967

INVENTOR
GEORGE C. BROWN
DANIEL M. KLANG
BY Laurence J. Marhoefer
ATTORNEY

United States Patent Office 3,433,426

Patented Mar. 18, 1969

3,433,426

REWIND CONTROL CIRCUIT

George C. Brown, Syosset, and Daniel M. Klang, Huntington Station, N.Y., assignors to Potter Instrument Company, Inc., Plainview, N.Y., a corporation of New York Filed June 8, 1967, Ser. No. 644,508

U.S. Cl. 242—55.12 7 Claims

Int. Cl. G11b 15/44

ABSTRACT OF THE DISCLOSURE

A rewind system for a single capstan magnetic tape transport in which the lower file reel vacuum buffer sensor and the upper machine reel vacuum buffer sensor control the rotational speed of the capstan during rewind.

*Background of the invention*

This invention relates to a high speed rewind system for a magnetic tape transport. More particularly, it relates to an improved rewind system for a single capstan transport in which the capstan is directly driven by a low-inertia motor and each reel servomotor is controlled in a so-called on-off mode. A transport employing this mode of reel servocontrol is disclosed in the copending application of Frederick G. Moritz, Ser. No. 545,769, filed Apr. 27, 1966 and assigned to the same assignee as this invention.

Basically, the principal function of a magnetic information storage tape transport is to rapidly start and stop the relatively thin magnetic tape and to move it past a transducer at a uniform speed. Advantageously, the economical performance of this function determines the design of the transport. However, it is additionally desirable that the transport be capable of rewinding the tape at high speed without stretching or otherwise damaging the tape.

A number of rewind systems have been proposed in the prior art for various transports, but these known systems either unduly complicate the reel servosystem or are slow or are potentially injurious to the tape when used in a single capstan transport in which the capstan is directly driven by a low inertia motor.

One object of the invention, therefore, is the provision of an improved rewind system for a single capstan transport which permits the tape to be rewound quickly and safely.

Another object of the invention is the provision of an improved rewind system for single capstan transports which does not materially add to the cost of the transport or complicate the reel servosystem.

Still another object of the invention is the provision of an improved rewind system in which the tape is continuously and closely controlled during rewind.

*Summary of the invention*

Briefly, this invention contemplates the provision of a rewind system in which the capstan drives the tape at a high speed so long as the length of the buffering tape loops is between certain maximum and minimum values and drives the tape at a lower speed when length of either loop is outside these values. The lower sensor in the supply reel buffer and the upper sensor in the take-up reel buffer are used advantageously for controlling the capstan speed.

Upper and lower sensors in each buffer control the reel servos in their normal on-off operating mode with the exception that the field current to the motors is diminished during rewind in order to permit them to operate at a higher than normal speed.

*Description of the preferred embodiments*

Figure 1:
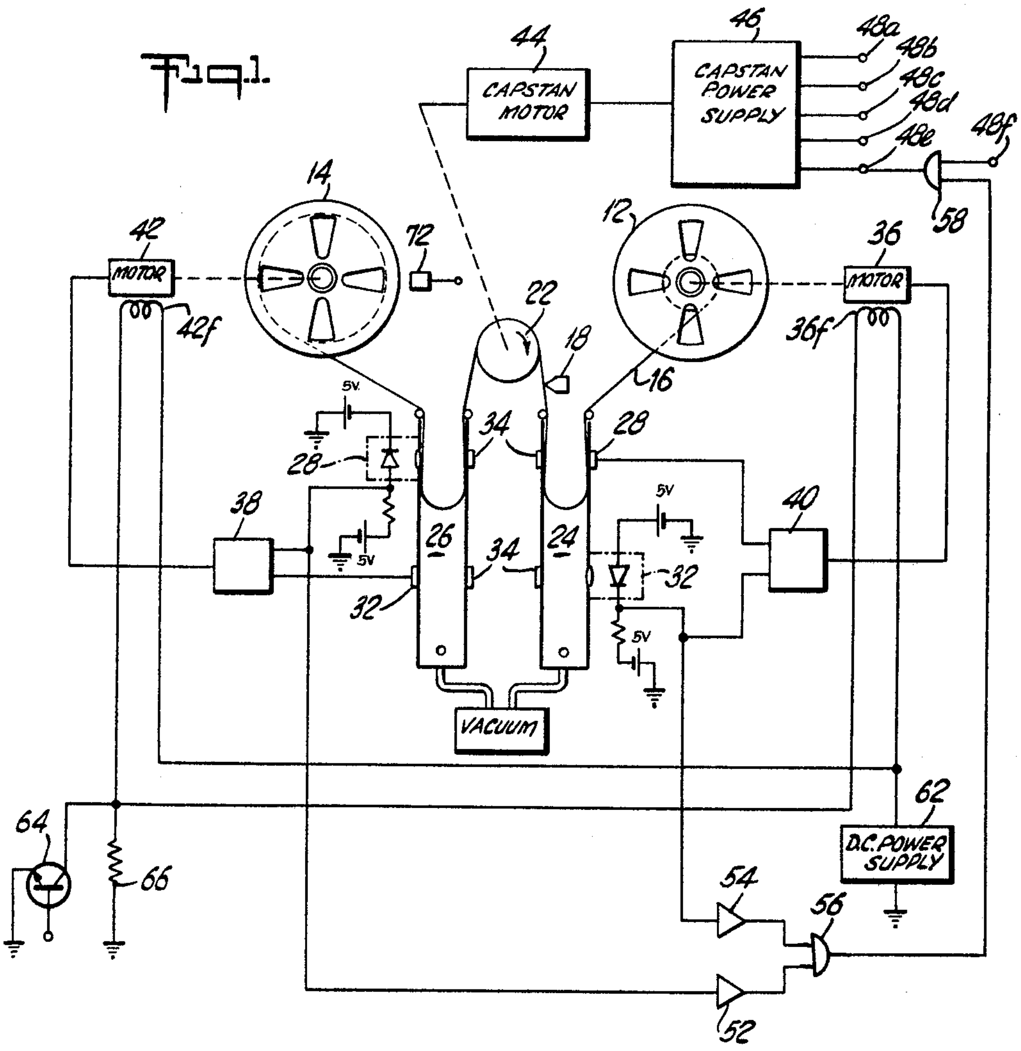
FIGURE 1 is a schematic view of a transport employing one embodiment of the rewind system of this invention.

Referring now to FIGURE 1, the information storage tape transport has a file reel 12 and a machine reel 14 rotatably mounted on a chassis (not shown). An information storage tape 16 extends from the file reel 12 to the machine reel 14 along a path that takes it past a magnetic transducer 18. The tape 16 frictionally engages a capstan 22 centrally disposed between vacuum columns 24 and 26, which serve to form loops in the tape that provide low inertia buffering storage between the capstan 22 and the reels 12 and 14 respectively and also serve to hold the tape against the capstan 22. The vacuum columns 24 and 26 may be designated conveniently as the file and machine buffers, respectively. It will be appreciated that the designations file and machine as used in connection with reels 12 and 14 and their associated buffers are merely for convenience.

In each of the vacuum columns 24 and 26 there is an upper photodiode sensor 28 and a lower photodiode sensor 32 illuminated by light sources 34. The outputs of the sensors 28 and 32 in the file reel vacuum column buffer 24 are coupled to a file reel control circuit 40, the output of which controls a file reel servomotor 36. Similarly, the outputs of sensors 28 and 32 in the machine reel vacuum column buffer 26 are coupled to a machine reel control circuit 38 whose output controls a machine reel servomotor 42. Servomotors 36 and 42 are shunt wound D.C. motors whose field windings **36*f* and 42*f* each have one terminal coupled to the positive terminal of a D.C. power supply, the negative terminal of which is grounded. A transistor switch 64 couples the other terminal of each field winding to ground. It should be noted that transistor 64 shunts a resistor 66 so that when the transistor is biased to cut off, resistor 66 is coupled in series with the field windings 36*f* and 42*f***, diminishing the flow of current through them and thereby increasing the speed of the motor for a given applied armature potential.

The arrangement and operation of the photodiodes 28 and 32, the control circuits 40 and 38, and the servomotors 36 and 42 may be the same as that shown in the aforementioned copending application of Frederick G. Moritz, Ser. No. 545,769, filed Apr. 27, 1966, to which reference may be made for details of their operation. Briefly, as disclosed in that application, when the bight of the tape loop rises above the upper sensor 28 in either column 24 or 26, the associated reel (12 or 14, respectively) is rotated in a direction that feeds tape into the column; when the bight of the loop drops below either of the sensors 32, the associated reel is rotated in a direction that withdraws tape from that column; and when the bight of the loop is between the sensors 28 and 32 in either column, the associated reel is electrodynamically braked.

A low inertia D.C. motor 44, which is energized by a suitable capstan motor power supply 46, is directly coupled to the capstan 22 for driving it. Conveniently, the capstan motor 44 may be a printed circuit motor with its field provided by permanent magnets.

The capstan motor supply 46 is capable of providing several different outputs, which may be selected by the application of a proper logic (voltage) level on one or more of the input terminals 48*a*, 48*b*, 48*c*, and 48*d* and 48*e*. For example, a positive potential at terminal 48*a* may enable forward (counterclockwise) rotation of capstan 22; a positive input at 48*b* may enable the capstan reverse (clockwise) rotation. Terminals 48*c* and 48*d* may be used for normal running and for starting and stopping, respectively.

Figure 2:
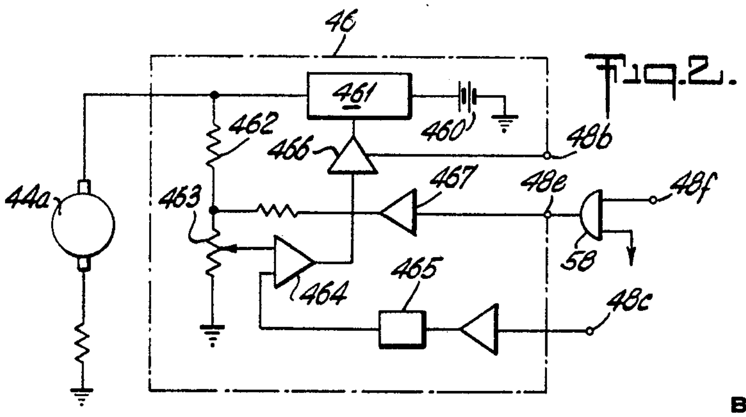
FIGURE 2 is a schematic view of certain pertinent parts of a capstan motor power supply which may be used in the practice of this invention.

Referring now to FIGURE 2 in addition to FIGURE 1, the power supply 46 may include a source of D.C. potential 460 which is coupled via a voltage regulator network 461 to the armature 44*a* of capstan motor 44. The output of a potentiometer 463, is coupled as one input to a difference or comparison circuit 464 the other input to which is a D.C. reference potential from a reference potential source 465. It will be appreciated that potentiometer 463 and a resistor 462 are coupled as a voltage divider network across armature 44*a*.

An amplifier 466 couples an output from different circuit 464 to voltage regulator 461 in order to maintain the input to the motor armature 44A at a constant value which may be adjusted by adjusting potentiometer 463. Conveniently, the output amplifier 466 may be clamped to a fixed potential during counterclockwise operation and unclamped by a suitable input at terminal 48*b* which selects reverse or clockwise capstan rotation.

An amplifier 467 couples an input at terminal 48*e* to the common terminal of resistors 462 and potentiometer and provides a bias at the input potentiometer 463 to difference circuit 464 of opposite polarity to that of the reference signal from 465. Thusly, it will be appreciated that an input at terminal 48*e* causes the output potential from regulator 461 to increase and thereby causes the capstan motor 44 to rotate at a higher speed. A more detailed description of a suitable capstan supply may be found in the copending application Ser. No. 643,994, filed June 6, 1967 and assigned to the same assignee as this invention.

In addition to their respective connection to the file and machine reel control circuits, output of the upper sensor in machine vacuum column buffer 26 and the lower sensor 32 in file vacuum column buffer 24 are coupled via amplifiers 52 and 54 and an AND gate 56 as one input to an AND gate 58 in order to control the speed of the capstan motor 44 during rewind. The other or enabling input to AND gate 58 is connected to a terminal 48*f*.

In rewind operation, a suitable command signal is applied at terminal 48*b* unclamping the output of amplifier 466 and enabling clockwise rotation of capstan 22; a suitable signal is applied at terminal 48*f* to enable gate 58. The base of transistor 64 is biased to cut it off connecting resistor 66 in series with the field windings 36*f* and 42*f*. The terminals 48*c* and 48*d* are energized to start and stop the capstan for rewind in the same manner as the capstan is started and stopped in normal operation. The signals for rewind, for example, may be generated by a computer to which the transport is coupled or manually or in any other suitable manner known in the art. Conveniently, a beginning of tape sensor 72 may be used for generating a signal to stop the rewind when the beginning of tape marker on the tape is sensed.

After starting, as long as the bights of the loops in vacuum columns 24 and 26 stay above the lower sensor 32 and below the upper sensor 28, respectively, an output from AND gate 56 enables gate 58 causing the motor 44 to be energized with a relatively high voltage which results in high speed rotation of the capstan 22. In one specific embodiment of the invention, an advantageous speed ratio for high rotational speed to normal rotational speed was found to be about 5 to 1.

It should be noted that during high speed rotation, the capstan is capable of transporting tape at a higher rate than the reels 14 and 12 are capable of paying it out and taking it up, respectively. When the loop in column 24 falls below the sensor 32, the output from this sensor becomes negative and the output of AND gate 56 changes polarity, disenabling gate 58. With gate 58 disenabled, the power supply 46 continues to energize motor 44, but at a lower voltage so that the capstan continues to rotate but at a lower speed. When the loop rises above the sensor 32, AND gate 58 is again enabled, the voltage across the capstan armature increases, and high speed capstan rotation resumes.

Similarly, if the loop in column 26 rises above the upper sensor 28, the output of this sensor goes negative, disenabling gate 58; the capstan 22 continues to rotate but at a lower speed. When the loop again drops below the sensor 28 in column 26, high speed rotation resumes.

It should be noted that the upper sensor 28 in column 24 and the lower sensor 32 in column 26 are not used for controlling the capstan speed during rewind.

It should be understood that certain features and subcombinations are of utility and may be employed without reference to other features and subcombinations. This is contemplated by and is within the scope of the claims. It is further obvious that various changes may be made in details without departing from the spirit of the invention. It is, therefore, to be understood that this invention is not to be limited to the specific details shown and described.

What is claimed is:

1. A high speed system for rewinding a magnetic tape onto a file reel from a machine reel in a tape transport employing a single capstan driven by a directly coupled motor and having file and machine loop forming buffers disposed respectively between the file reel and the capstan and the machine reel and the capstan comprising, in combination:

first means for energizing the capstan drive motor to cause rotation of the capstan at a first high rewind speed, means for generating a first signal when the tape loop in the file buffer exceeds a first predetermined length, means for generating a second signal when the tape loop in the machine buffer is less than a second predetermined length, and means responsive to said first signal or said second signal or both of said first and said second signals for energizing said capstan drive motor to cause rotation of said motor at a second rewind speed lower than said first rewind speed.

2. A high speed rewind system as in claim 1 wherein said first predetermined length exceeds said second predetermined length.

3. A high speed rewind system as in claim 2 wherein said file and machine buffers are vacuum columns.

4. A high speed rewind system as in claim 3 further including an upper and a lower sensor in each of said vacuum columns and wherein said means for generating a first signal includes the lower sensor in said file buffer and said means for generating a second signal includes the upper sensor in said machine buffer.

5. A high speed rewind system as in claim 4 wherein said file reel is driven by a shunt wound D.C. servo motor whose rotation is controlled by the upper and lower sensor in said file buffer and said machine reel is driven by a shunt wound D.C. servo motor whose rotation is controlled by the upper and lower sensor in said machine buffer.

6. A high speed rewind system as in claim 5 further including means for connecting a resistor in series with the field windings of said reel servo motors.

7. A high speed rewind system as in claim 6 wherein said second lower speed is substantially equal to a forward operating speed for said transport.

References Cited

UNITED STATES PATENTS

| | | | |
|---|---|---|---|
| 3,302,900 | 2/1967 | Messamer | 242—55.12 |
| 3,304,018 | 2/1967 | Kurth | 242—55.12 |
| 3,354,318 | 11/1967 | Wahlstrom | 250—219 |

LEONARD D. CHRISTIAN, *Primary Examiner.*